United States Patent
Brunet et al.

(10) Patent No.: US 10,843,935 B2
(45) Date of Patent: Nov. 24, 2020

(54) METHOD FOR PRODUCING NANOMAGNETITE

(71) Applicants: CENTRE NATIONAL DE LA RECHERCHE SCIENTIFIQUE, Paris (FR); UNIVERSITÉ D'AIX-MARSEILLE, Marseilles (FR)

(72) Inventors: Fabrice Brunet, Coublevie (FR); Camille Crouzet, Gieres (FR); Bruno Goffe, Venelles (FR)

(73) Assignees: CENTRE NATIONAL DE LA RECHERCHE SCIENTIFIQUE, Paris (FR); UNIVERSITE D'AIX-MARSEILLE, Marseilles (FR)

( * ) Notice: Subject to any disclaimer, the term of this patent is extended or adjusted under 35 U.S.C. 154(b) by 0 days.

(21) Appl. No.: 16/307,425

(22) PCT Filed: Jun. 6, 2017

(86) PCT No.: PCT/EP2017/063734
§ 371 (c)(1),
(2) Date: Dec. 5, 2018

(87) PCT Pub. No.: WO2017/211845
PCT Pub. Date: Dec. 14, 2017

(65) Prior Publication Data
US 2019/0300381 A1    Oct. 3, 2019

(30) Foreign Application Priority Data
Jun. 6, 2016 (FR) .................................. 16 55158

(51) Int. Cl.
*C01G 49/08* (2006.01)
*B03C 1/00* (2006.01)
(Continued)

(52) U.S. Cl.
CPC .............. *C01G 49/08* (2013.01); *B03C 1/002* (2013.01); *B22F 9/12* (2013.01); *C09C 1/24* (2013.01);
(Continued)

(58) Field of Classification Search
CPC ........................................................ B22F 9/12
See application file for complete search history.

(56) References Cited

U.S. PATENT DOCUMENTS

| | | |
|---|---|---|
| 5,004,496 A | 4/1991 | Aune et al. |
| 2004/0101474 A1 | 5/2004 | Otsuka et al. |

(Continued)

FOREIGN PATENT DOCUMENTS

| | | |
|---|---|---|
| EP | 2749536 A1 | 7/2014 |
| GB | 191219002 | 7/1913 |

(Continued)

OTHER PUBLICATIONS

Malvoisin et al., Benjamin, "High-purity hydrogen gas from the reaction between BOF steel slag and water in the 473-673 K ra," International Journal of Hydrogen Energy, vol. 38, No. 18, pp. 7382-7393, May 3, 2013, Elsevier Science Publishers B.V., Barking, Great Britain.

(Continued)

*Primary Examiner* — Melissa S Swain
(74) *Attorney, Agent, or Firm* — Hauptman Ham, LLP (57) ABSTRACT

The application relates to a method for preparing magnetite, comprising steps of:
a) reaction at a temperature of 100° to 500° C. of a material containing wüstite with water, in order to obtain a solid comprising magnetite, and then
b) recovery of the magnetite in the form of particles wherein more than 25% by weight are of nanometric size.

20 Claims, 3 Drawing Sheets

(51) Int. Cl.
  H01F 1/14      (2006.01)
  H01F 1/34      (2006.01)
  C09C 1/24      (2006.01)
  B22F 9/12      (2006.01)
  C01B 3/06      (2006.01)
  C02F 1/48      (2006.01)
  B82Y 25/00     (2011.01)

(52) U.S. Cl.
  CPC ............... H01F 1/14 (2013.01); H01F 1/344 (2013.01); B03C 2201/18 (2013.01); B82Y 25/00 (2013.01); C01B 3/061 (2013.01); C01P 2004/03 (2013.01); C01P 2004/04 (2013.01); C01P 2004/61 (2013.01); C01P 2004/62 (2013.01); C01P 2004/64 (2013.01); C01P 2006/42 (2013.01); C02F 1/48 (2013.01); Y02E 60/36 (2013.01)

(56) References Cited

U.S. PATENT DOCUMENTS

2005/0191231 A1* 9/2005 Sun .................. C09C 1/24
                                              423/632
2010/0212457 A1  8/2010 Drnevich et al.
2012/0027672 A1  2/2012 Wang et al.

FOREIGN PATENT DOCUMENTS

RU   2528918 C1 * 9/2014
WO   2010132784 A1 11/2010
WO   2011145080 A1 11/2011
WO   2012007591 A1  1/2012
WO   2014154910 A1 10/2014

OTHER PUBLICATIONS

Iida et al., Hironori, "Synthesis of Fe3O4 nanoparticcles with various sizes and magnetic properties by controlled hydrolysis," Journal of Colloid and Interface Science, vol. 314, Issue 1, pp. 274-280, Oct. 1, 2007.
Martinez-Mera et al., I., "Synthesis of magnetite (Fe3O4) nanoparticles without surfactants at room temperature," Materials Letters, vol. 61, Issues 23-24, pp. 4447-4451, Sep. 2007.
Eloneva et al., Sanni, "Steel Converter Slag as a Raw Material for Precipitation of Pure Calcium Carbonate," Industrial & Engineering Chemistry Research, vol. 47, No. 18, pp. 7104-7111, Aug. 1, 2008.
Kelland, D.R., "Magnetic separation of nanoparticles," IEEE Transactions on Magnetics, vol. 34, Issue 4, Retrieved Nov. 30, 2018, https://ieeexplore.ieee.org/document/706824.
International Search Report from corresponding International Application No. PCT/EP2017/063734, dated Aug. 16, 2017, pp. 1-3, European Patent Office, Rijswijk, The Netherlands.
Hacker et al., V., "Hydrogen production by steam-iron process," Journal of Power Sources, 2000, 86(1-2), 531-535.
Huijgen et al., "Carbonation of Steel Slag for CO2 Sequestration: Leaching of Products and Reaction Mechanisms," Environmental Science & Technology, 2006, 40(8), 2790-2796.
Matsuura et al., H., "Thermodynamic Calculation of Generation of H2 Gas by Reaction between FeO in Steelmaking Slag and Water Vapor," ISIJ international, 2012, 52(8), 1503-1512.
International Preliminary Report on Patentability issued in International Application No. PCT/EP2014/056489, p. 1, The International Bureau of WIPO, Geneva, Switzerland.
Written Opinion issued in International Application No. PCT/EP2014/056489, pp. 1-5, European Patent Office, Rijswijk, Netherlands.

* cited by examiner

METHOD FOR PRODUCING NANOMAGNETITE

DOMAIN OF THE INVENTION

The present invention relates to a method for preparing magnetite in the form of particles of nanometric size.

TECHNOLOGICAL BACKGROUND

Magnetite, of formula $Fe_3O_4$, is a mineral very rich in iron, dense (density of 5.1 g/cm$^3$), magnetic, of great hardness (5.5 to 6 on the Mohs scale) and of high thermal conductivity (5 W/m·K). It is an inert mineral, very stable in the environment and without risk to health. All these properties make a highly sought mineral of it, first of all as a source of iron, since it is an iron-based mineral with the highest iron content. 750 million tons are extracted annually in order to satisfy one third of the world requirements for steel (1.5 billion tonnes). Magnetite is also used for many other industrial applications such as ballast, dense concretes, materials for protection against radiation or the treatment of sludge. For some applications such as paint pigments, toners or water treatment or for producing ferrofluids, it is used in micrometric or nanometric form.

Magnetite of nanometric size is particularly sought. It combines in fact the unique properties of superparamagnetism and of surface reactivity characteristic of nanoparticles and not being obtained by other particle sizes.

Grinding $Fe_3O_4$ ore best makes it possible to prepare particles with a size of a few microns, or even of around 500 nm, but does not make it possible to achieve nanometric sizes.

Numerous methods for preparing magnetite are known, some from wüstite, but these methods generally lead to obtaining magnetite in the form of particles of micrometric or submicrometric size.

The application WO 2014/154910 describes a method for preparing hydrogen by reacting steelworks slag with water. A solid containing magnetite is a by-product of the hydrogen obtained during this reaction. It is used for monitoring progress with the hydrogen production reaction by magnetic method. However, the magnetite has neither been separated from the rest of the solid obtained, nor characterised, since the objective of the method described in this application is to prepare hydrogen, rather than magnetite, which is solely a by-product of the reaction.

The usual method for preparing nanometric particles of magnetite is chemical synthesis from soluble iron (for example $FeCl_2$) [1, 2], itself obtained from the treatment of steelmaking waste with hydrochloric acid.

SUMMARY

One of the objectives of the invention is to provide a method for preparing magnetite in nanometric form alternative to the synthesis from soluble iron described above.

To this end, the invention relates to a method for preparing magnetite comprising the steps of:

a) reaction at a temperature of 100° to 500° C. of a material containing wüstite with water, in order to obtain a solid comprising magnetite, and then b) recovery of the magnetite in the form of particles, more than 25% of which by weight are of nanometric size.

Generally, the method according to the invention makes it possible to prepare magnetite in the form of particles of micrometric and nanometric sizes. More than 25% by weight of these particles are of nanometric size.

Within the meaning of the present application, the sizes of the particles correspond to the diameters thereof determined by electron imaging (scanning electron microscopy (SEM)), for example with a Zeiss Ultra 55 apparatus, or transmission electron microscopy (TEM), for example with a JEOL FEG-2100F apparatus). "Nanometric" means less than 500 nm, preferably less than 250 nm. "Micrometric" means from 500 nm to 500 µm, preferably 1 to 200 µm.

The method comprises a step a) of reaction at a temperature of 100° to 500° C. of a material containing wüstite with water in order to obtain a solid comprising magnetite.

The material containing wüstite is typically in the form of grains of size from 10 nm to 10 cm, typically 25 nm to 1 cm, for example from 50 nm to 50 µm. The method may comprise, prior to step a), a step of grinding the material containing wüstite, or be free thereof (the material then being used in its initial form).

The reaction of step a) is generally implemented in a reactor. The material containing wüstite and the aqueous solution can be put in contact in the reactor, for example by introducing the material containing wüstite before the aqueous solution in the reactor, or, preferably, before the reactor. Typically, a suspension of the material containing wüstite in the aqueous solution is introduced into the reactor, for example by means of a fluidised bed.

The material containing wüstite generally comprises at least 5% by weight, typically at least 10% by weight wüstite (FeO).

In one embodiment, the material containing wüstite is a steelworks slag, particularly a conversion steelworks slag (CSS) (basic-oxygen-furnace (BOF) slag) or an electric arc furnace (EAF) slag. Such steelworks slags generally contain from 5% to 40% by weight, typically from 10% to 20% by weight wüstite.

The worldwide production of CSS and EAF slag is approximately 150-200 million tonnes per annum. The manufacture of steel produces, during the last step of transformation of the cast iron in oxygen converters, around 100-150 kg of steelworks slag per tonne of steel. This steelworks slag is mainly reprocessed for applications with lower added value (backfill or aggregates), some remaining stored as waste in the form of waste dumps on steelmaking sites. For example, for 40 years, the FOS sur Mer factory has stored 12 million tons of steelworks slag. There therefore exists a need to develop methods for reprocessing this steelworks slag.

In this embodiment, the method according to the invention advantageously allows the preparation of nanomagnetite with high added value from an abundant material, produced in mass by steelmaking and currently mainly considered to be waste. Advantageously, the temperatures required for implementing the reaction of step a) can be achieved using residual heat from the steelworks.

When the material containing wüstite is a steelworks slag, the method may comprise, before step a), a step of grinding the steelworks slag, typically to a grain size of 10 nm to 100 µm, for example from 50 nm to 50 µm. The grain size of steelworks slag obtained after grinding appears to have little or no influence on the kinetics of the reaction of step a). The method can therefore also be free from the prior step of grinding the steelworks slag.

The steelworks slag used in the method may be a partially cooled fresh slag, typically having a temperature below 500° C., or a slag at ambient temperature (around 25° C., as in the case of a slag that has previously been stored. Using a partially cooled fresh slag advantageously makes it possible not to have to reheat the slag to the reaction temperature of step a). Even if the use of a slag at ambient temperature requires heating to achieve the temperatures required at step a), the method remains advantageous in that it makes it possible to reprocess the stocks of steelworks slag.

The steelworks slag may be aged or not, this ageing being able to be natural or artificial.

Natural ageing of slag consists of exposing it to the weather. Steelworks slag contains CaO (approximately 40% by weight). The combined action of moisture and carbon dioxide present in the atmosphere will little by little transform the free lime into more stable compounds in accordance with the following reactions:

Hydration reaction: $CaO + H_2O \rightarrow Ca(OH)_2$

Carbonation reaction: $Ca(OH)_2 + CO_2 \rightarrow CaCO_3 + H_2O$

The steelworks slag used in the method may be aged artificially. For example, the method may comprise, before step a), a step of treating the steelworks slag with carbon dioxide ($CO_2$) (carbonation), for example in accordance with the method described in [3].

Alternatively, this carbonation may be implemented at the same time as step a). Thus, in one embodiment, step a) is implemented by maintaining a partial pressure of $CO_2$. This embodiment allows greater sequestration of the $CO_2$ while maintaining the production of nanomagnetite. The dissolution of carbonic acid during step a) lowers the pH to values below 6 (situated between 5 and 6).

It has been observed that carbonation (before or during step a) has little influence on the magnetite yield obtained at the end of the method. Even if the carbonation of the steelworks slag makes it possible to reduce the quantity of CaO, which is unfavourable to the reaction in that it increases the pH of the aqueous solution, X-ray diffraction measurements have shown that part of the iron is trapped in the iron carbonates and is therefore no longer available to form magnetite.

The reaction of step a) of the method is carried out in the presence of water, generally in the presence of an aqueous solution. As detailed below, preferably, the pH of the aqueous solution of pH is below 7. However, the CaO, $Ca(OH)_2$ and $CaCO_3$ compounds of the steelworks slag are basic, which means that it is necessary to use large quantities of acid for the aqueous solution to have a pH below 7. In order to avoid having to use large quantities of acid, the steelworks slag used in step a) may be decalcified (completely or partially). In order to decalcify the steelworks slag, the method may comprise, before step a), a step of putting the steelworks slag in contact with an aqueous decalcification solution with a pH of 1 to 6, generally 2 to 5, typically an acetic acid solution at a concentration for example of between 0.5 and 10 mol/litre, by means of which a mixture of the steelworks slag and the aqueous decalcification solution is obtained. Other types of acid could of course be used. The putting in contact is generally implemented at a temperature of 0 to 50° C., typically at ambient temperature (around 25° C.) and preferably at atmospheric pressure (around 1 bar). This prior decalcification step is simple and quick and makes it possible to decalcify the steelworks slag effectively, in that it makes it possible to minimise the quantities of acid to be used during step a), when it is wished for the aqueous solution to have a pH below 7. In this regard, on an industrial level, it is easier, more economical and safer for the operators to add a step of pretreatment with an acidic aqueous solution at ambient temperature and atmospheric pressure rather than carrying out the reaction of step a), generally carried out at high temperatures and pressure, with large quantities of acid.

Typically, the method then comprises, after the step of putting the steelworks slag in contact with an aqueous decalcification solution with a pH of 1 to 6 and before step a), a step of separating the aqueous decalcification solution and the steelworks slag (typically by filtration or centrifugation). This is because, generally, the decalcification solution is not used to implement step a) since it comprises many dissolved species, in particular calcium.

The method may comprise, after the step of putting the steelworks slag in contact with an aqueous solution with a pH of 1 to 6 and before step a), a step of adding $CO_2$ to the mixture of steelworks slag and the aqueous decalcification solution, and then a step of separating the aqueous decalcification solution and steelworks slag. The aqueous decalcification solution is rich in dissolved calcium, the addition of $CO_2$ allows precipitation of calcium carbonate and regeneration of the initial acid, and therefore of the aqueous decalcification solution, which can then be reused to implement decalcification [4].

In another embodiment, the material containing wüstite is wüstite (FeO).

This embodiment is the one that makes it possible to obtain the best kinetics for reaction a). Having said that, it is not the most economical embodiment, since the FeO used as the starting product is much more expensive than steelworks slag. In addition, the magnetite yields (compared with the iron contained in the material containing wüstite used) are similar to those obtained using a steelworks slag as the starting product.

Preferably, the specific surface area of the wüstite, as measured by gas volumetric analysis (N2-BET method) is greater than 0.3 m$^2$/g.

In another embodiment, the material containing wüstite is a steelmaking residue in the form of particles with sizes, measured by field-effect scanning electron microscopy, of 1 μm to 400 μm, generally with a mean size of between 15 and 75 μm. These particles generally comprise 30% to 70% by weight, in particular 40% to 60% by weight, wüstite. Typically, this residue is in the form of:

dust issuing from the production of steel abrasives. This dust is produced during a method of air hardening of the newly produced abrasives. The mineralogical composition of this dust is typically 35% to 50% by weight wüstite, 18% to 38% by weight magnesian fayalite $(Fe,Mn)_2SiO_4$, 12% to 32% by weight magnetite $(Fe_3O_4)$ and 0 to 15% by weight haematite $(Fe_2O_3)$. The average size of the particles of this dust measured by field-effect scanning electron microscopy of this sludge is generally 15 to 35 μm, or settling sludge resulting from the production of the steel abrasive. This sludge is produced during the hardening of the liquid steel giving rise to the formation of abrasives. The settling sludge contains the excessively fine particles and some of the impurities present in the molten steel. The mineralogical composition of this sludge is typically 45% to 65% by weight wüstite, 35% to 55% by weight magnesian fayalite $(Fe,Mn)_2SiO_4$, and 0 to 20% by weight magnetite $(Fe_3O_4)$. The average size of the particles of this sludge measured by field-effect scanning electron microscopy is generally 40 to 60 μm.

The three embodiments described above are not limitative. It is possible to use other materials containing FeO.

The temperature during the reaction of step a) is 100° to 500° C., in particular 150° to 350° C., for example 150° to 250° C. Without wishing to be bound by any particular theory, the increase in the temperature would appear to favour both the dissolution kinetics of FeO and the kinetics of the oxidation of FeO, which would make it possible to accelerate the conversion of the reaction.

Generally, the pressure during the reaction of step a) is around 5 to 700 bar, in particular 10 to 400 bar, preferably 40 to 200 bar.

These temperatures and pressures are in fact particularly suitable for the yield of the reaction to be good. In practice, the pressure and temperature are preferably such that the water is not in a supercritical condition. This is because a method using supercritical water is generally more difficult to implement industrially.

Reaction a) uses water, preferably the water of an aqueous solution the pH of which is less than 7 when it is at 25° C. and 1 bar.

During the reaction, the water of the aqueous solution is in gaseous and/or liquid form. Generally, at least part of the aqueous solution is in liquid form.

Within the meaning of the application, the pH of the aqueous solution is the pH measured when the aqueous solution is at 25° C. and 1 bar (ambient temperature and atmospheric pressure), typically at the start of the reaction (t=0), that is to say when the material containing wüstite and the aqueous solution are raised to the reaction temperature, lying between 100° and 500° C. The aqueous solution may be partially gaseous under the temperature and pressure conditions of the reaction but, when it is condensed at 25° C. and 1 bar, the pH thereof is preferably less than 7.

The pH plays an important role in the kinetics of the reaction of step a). Without wishing to be bound by any particular theory, acidity would appear to favour the FeO dissolution kinetics and would accelerate the conversion of the reaction. a pH above 1, or even 2, is preferred. This is because the majority of reactors do not withstand aqueous solutions having a lower pH and the reactors able to withstand this are expensive. Preferably, the pH of the aqueous solution is 1 to 6, in particular 2 to 5, typically 2 to 4, for example 2.5 to 3.

The aqueous solution is typically an aqueous solution of one or more acids. A person skilled in the art is able to adjust the pH, in particular by adding one or more acids. Various acids, organic, inorganic or mixtures of acids, can be used. Mention can be made of hydrochloric acid as an inorganic acid that can be used. Organic acids comprising a group able to chelate with the iron ions, such as the —COOH group, are preferred. Typically, oxalic acid, acetic acid or a mixture thereof are used. Acetic acid is particularly preferred since it withstands high temperatures without degrading and favours the dissolution of iron and therefore the magnetite production reaction.

The quantity of acid to be introduced for the aqueous solution to have the required pH depends on the nature of the material comprising the wüstite. For example, when this material is a steelworks slag that contains CaO, Ca(OH)$_2$ and/or CaCO$_3$, larger quantities of acid are necessary for the pH of the aqueous solution to be below 7, since these compounds neutralise acid. When the material comprising the wüstite comprises little, or is free from, acidic and/or basic compounds (in particular wüstite or a precalcified steelworks slag), an aqueous solution of acetic acid at a concentration of 0.01 to 10 mol/litre, for example 0.1 to 2 mol/litre, is typically used.

It is possible to implement step a) with an aqueous solution with a pH above 7. In this case, it is generally necessary for the temperature during step a) to be higher than 300° C. in order to improve the conversion.

Typically, during step a), the ratio by weight of the wüstite contained in the material containing wüstite compared with the water is 1/0.1 to 1/1000, for example 1/1 to 1/100.

Preferably, the reaction medium is stirred during the reaction, for example at a speed of 50 to 1000 revolutions per minute, which increases the kinetics of the reaction of step a). Without wishing to be bound by any particular theory, stirring would appear to favour the homogenisation of the reaction medium and therefore the FeO dissolution kinetics, which would accelerate the conversion of the reaction of step a).

The duration of the reaction of step a) is generally less than 70 hours, preferably less than 48 hours, for example less than 15 hours, when it is implemented at a temperature of around 150° C. at a pressure between 150 and 200 bar and with an aqueous solution with a pH of 2 to 3. As explained above, the higher the temperature and the more the aqueous solution approaches the optimum pH range of 2.5 to 3, the shorter the duration of the reaction.

In one embodiment, the material containing wüstite is wüstite, the pH (as defined above) of the aqueous solution is 2 to 3, the pressure is 100 to 200 bar and the temperature is 150° to 250° C.

In another embodiment, the material containing wüstite is wüstite, the pH (as defined above) of the aqueous solution is 5 to 7, the pressure is 200 to 400 bar and the temperature is 300° to 500° C.

In another embodiment, the material containing wüstite is a steelworks slag that has not previously been decalcified, the pH (as defined above) of the aqueous solution s 6 to 12, the pressure is 200 to 400 bar and the temperature is 250° to 350° C.

In another embodiment, the material containing wüstite is a steelworks slag that has previously been decalcified (preferably by putting the steelworks slag in contact with an aqueous solution with a pH of 2 to 6, the pH (as defined above) of the aqueous solution is 3 to 4, the pressure is 100 to 200 bar and the temperature is 150° to 350° C., in particular 200° to 300° C.

Step a) is simple and economical, in that it consists of a hydrothermal treatment that uses only an aqueous solution, typically water or one or more acids. Generally no metal additional to those contained initially in the material containing wüstite is added during reaction a). Typically no material and/or compound other than the material containing wüstite and the aqueous solution (which generally consists of an aqueous solution of one or more acids) is added to implement the reaction of step a).

The reaction of step a) is an oxidation of the wüstite with water at a temperature in accordance with the following reaction diagram:

$$3FeO \text{ (wüstite)} + H_2O \rightarrow Fe_3O_4 \text{ (magnetite)} + H_2$$

The conversion of the reaction may be followed by analysis of the production of hydrogen in the gaseous phase, for example by gas chromatography. A gaseous phase sample can be extracted using a reactor equipped with a gas sampling system. The conversion of the reaction may also be followed by magnetic measurement.

During the reaction a solid comprising magnetite and a gaseous phase that comprises hydrogen are produced.

The method may comprise, between steps a) and b), a step of drying the solid comprising magnetite obtained during step a), for example by placing it in hot air.

The method comprises a step b) of recovery of the magnetite in the form of particles, more than 25% by weight of which are of nanometric size, from the solid obtained at step a).

When the material containing wüstite used as a starting product is wüstite, the solid obtained at the end of step a) comprises mainly magnetite, possibly residual wüstite and possibly other minority metal oxides, such as lepidocrite and/or goethite.

When the material containing wüstite used as a starting product comprises other compounds in addition to wüstite (typically for a steelworks slag), the recovery of step b) is generally carried out by magnetic separation. The magnetic separation is carried out by applying a magnetic field, which eliminates the majority of the phases containing calcium: calcite, portlandite and lamite, and keeping only the phases containing iron, intimately associated with the magnetite: $Fe_3O_4$, FeO, (Fe,Mg)O and $Ca_2(Fe,Al)_2O_5$. Thus magnetic separation makes it possible to recover a fraction rich in magnetite that contains wüstite as a minority (with a proportion by weight of magnetite generally greater than 80% of this magnetite-rich fraction).

The magnetic separation is typically carried out on a suspension of the solid obtained at the end of step a) in an aqueous solution, such as water and/or an acid solution, typically an aqueous solution with a pH below 6, for example an aqueous solution of hydrochloric acid or acetic acid. Ultrasound may be applied to the suspension in order to facilitate disaggregation of the solid aggregates. The step b) may therefore comprise the grinding of the solid comprising magnetite obtained at step a), then the preparation of a suspension of the ground solid in an aqueous solution, then the application of ultrasound to the suspension and then the magnetic separation.

Step b) may comprise a plurality of successive magnetic separation steps, during which the solid is suspended in identical or different aqueous solutions. Generally, step b) then comprises the substeps of:

b1) optionally grinding of the solid comprising magnetite obtained at step a), then
b2) addition of water or an acid solution to the solid comprising magnetite in order to obtain a mixture,
b3) magnetic separation of the mixture of step b2) in order to obtain a solid,
b4) addition of water or of an acid solution to the solid obtained at step b3) in order to obtain a mixture,
b5) magnetic separation of the mixture of step b4) in order to obtain the magnetite in the form of particles wherein more than 25% by weight are of nanometric size.

Typically, the grinding step b1) is implemented when the material containing wüstite used as a starting product in the method has not been ground and has been used in its initial form. When on the contrary the material containing wüstite used as a starting product in the method has been ground before implementing step a), step b1) is generally not implemented.

In steps b2) and/or b4), an acid solution is preferably used, since any residual calcium carbonates then dissolve in the acid solution and are therefore eliminated from the solid.

When a steelworks slag is used as the material containing wüstite, the iron oxide concentration of the solid obtained at the end of step b5) is generally greater than 90%, whereas it was 20% in the slag initially. The proportion of magnetite in the solid obtained at the end of step b5) is at least 80%.

The invention is based on the unexpected discovery that the solid obtained at the end of step b) comprises magnetite particles of nanometric size. This is because hydrothermal processes at temperatures of around 200°–300° C. often favour crystalline growth and therefore particles of plurimicrometric sizes.

The solid obtained at the end of step b) generally contains magnetite in the form of particles with three populations of size:
from 10 to 20 nm,
from 100 to 200 nm,
of micrometric size, typically 1 to 200 μm.

Such populations are generally obtained whatever the material containing wüstite used as the starting product (wüstite or steelworks slag). The proportion of each population can be determined for example by transmission electron microscopy and/or by laser granulometric analysis. The proportions by weight of nanomagnetite (that is to say the first two populations above) are greater than 25% with respect to the total magnetite (that is to say all the three populations above). The magnetite obtained at the end of step b) therefore has properties of superparamagnetism.

This magnetite can be used as it stands in numerous applications, for example as a pigment (the advantage of magnetite is its resistance to mineral alteration, which means that the pigment can be used outside in paints, concrete colouring, ground coverings, roads, tiles, glass), for storing heat by virtue of its exceptional physical properties (specific heat, thermal conductivity and density), as a materials densification agent (for example for preparing dense concretes for protection against radiation or for the densification of plastics and rubbers), for the treatment of water (magnetite has the advantage of its density and its ability to be sensitive to the magnetic field and being able to be recovered, entraining the material with it; filtering, sludge cleaning, water decontamination). As a source of iron in chemistry (chlorides, sulphates) for water treatment in sewerage plants, as an abrasive (low toxicity and effective) when it is used in powder form, in pressurised water jets for cutting, for catalysis in the ammonia and hydrocarbon industry, as an iron ore for steel making or as a fertilising additive.

Some applications require using magnetite in mainly nanometric form, for example the use of magnetite in toners for printers and photocopiers, or as a ferrofluid for high-tech applications: (medicine, hard-disk joints, innovative dampers for cars, heat transfer, etc.).

Thus the method may comprise, after step b), a step c) of separation of the nanometric particles from the magnetite obtained at step b). This separation may for example be carried out by a high-gradient magnetic separator (HGMS). Such a separator generally uses a matrix of the iron wool or expanded metal plate type introduced into a magnetic field. The separation takes place through the passage of the suspension to be separated through this metal matrix. Typically, this step makes it possible to separate the particles of nanomagnetite of size 10 to 20 nm from the rest of the magnetite [5]. The critical separation size depends in particular on the dimensions of the iron wool used: the smallest particles are recovered by the smallest iron wools. The separation of the particles into different granulometric classes is then carried out by successive passes of the suspension through finer and finer matrices. The nanomagnetites separated are extracted by cleaning these matrices.

The step c) of separation of the nanometric particles from the magnetite obtained at step b) may, before the separation by a high-gradient magnetic separator, comprise the separation of the magnetite particles obtained at step b) into two population groups of different sizes, this separation comprising the following substeps:

α) addition of water or an acid solution to the magnetite in the form of particles wherein more than 25% by weight are of nanometric size obtained at step b) in order to obtain a suspension, β) causing the suspension to flow in a receptacle and applying a magnetic force to the walls of the receptacle, by means of which the larger particles stick to the walls whereas the smaller particles remain in the flowing suspension, γ) recovering the smaller particles.

Thus the particles are separated into two groups of particles of different sizes by putting the magnetic attraction force in competition with a flow force. The largest particles are more sensitive to the magnetic field and will be attracted by the magnetic field while the finer ones are kept in the suspension.

For example, the flow is created by stirring the suspension in the receptacle. The magnetic force can be initiated by a permanent magnet or an electromagnet the intensity of which varies with the magnet used.

The separation of the magnetite particles obtained at step b) into two population groups of different sizes can be improved by the use of ultrasound to facilitate the disaggregation of the aggregates of particles.

The high-gradient magnetic separator (HGMS) then makes it possible to recover the particles of nanomagnetite from the smaller particles obtained at step γ).

This step of separation of the magnetite particles obtained in step b) into two population groups with different sizes is optional depending on the efficacy of the separation with the high-gradient magnetic separator (HGMS) and according to the distribution of the magnetite particles. Thus, as an alternative, the separation with the high-gradient magnetic separator (HGMS) is carried out directly on the magnetite particles obtained at step b).

The particles of nanometric size obtained at step c) generally have a specific surface area, measured by $N^2$-BET, of 5 to 200 $m^2/g$.

Preferably, the separation step c) makes it possible to separate each of the three populations of magnetite particles.

The by-products of the method are hydrogen and when a steelworks slag has been used as the material containing wüstite, a solid residue based on stabilised silicate, which may for example be used as aggregates.

The hydrogen produced can also be reprocessed. The method may comprise, after step a), a step of cooling the gaseous phase, typically to ambient temperature (25° C.), to allow separation of the hydrogen and steam which condenses. This step makes it possible to recovery hydrogen. The heat of the gaseous phase may optionally be recovered by means of a heat exchanger and reused, typically for step a).

The method may be implemented by batch or continuously.

BRIEF INTRODUCTION OF THE DRAWINGS

The following examples and figures illustrate the invention.

DETAILED DESCRIPTION

Example 1: Preparation of Magnetite from WÜStite wüstite (FeO 99.9%, Aldrich) was ground and sieved to a particle size of 50 to 100 μm and a specific surface area measured by N2-BET (Belsorp-Max supplied by BEL Japan, Inc. III) of 0.70 $m^2/g$. The state of oxidation of the iron in the starting material, quantified by Mössbauer spectroscopy (make Ortec) (was 91.6% $Fe^{2+}$, 5.6% $Fe^{3+}$ and 2.8% FeO. The mean state of oxidation of the iron corresponds to pure Fe(II), in accordance with the grade of FeO used.

For experiments 1 to 3, the wüstite was used without prior grinding. For the other experiments, it was ground (50-100 μm).

The aqueous solutions were aqueous solutions of acetic, oxalic or hydrochloric acid in the concentrations and at the pHs indicated in table 1, or water.

Experiments 1 to 19 were carried out in gold capsules 2 cm long, 4.0 mm outside diameter and 3.6 mm inside diameter. 80 mg of wüstite and the aqueous solution were introduced therein with a ratio by mass of 1/1. The closed capsule was introduced into a reactor under pressure itself introduced into a furnace. Temperatures of 100° to 200° C. at a pressure of argon of 300 bar were used. At the end of the experiment, a compressed air flow was used to lower the pressure. The gaseous phase produced by the sample was recovered for analysis.

Experiments 20 to 22 were carried out in a 500 ml autoclave made from Hastelloy™ provided with two external ceramic heating bands for heating. The reaction medium was stirred at 800 revolutions per minute. This autoclave enables the production of hydrogen to be monitored in real time and therefore enables the reaction to be converted. The gaseous phase sample at high pressure and temperature taken off was condensed in a cold-water condenser and then analysed by gas chromatography. Samples of solution were also taken by means of a capillary and filtered on a 0.2 μm pore titanium filter for subsequent analysis by inductively coupled plasma-optical emission spectrometry (ICP-OES) (Varian 720ES). The experiments were carried out with an FeO/water mass ratio of 1/200.

The components of the gaseous phase ($H_2$, $CO_2$, $N_2$, $O_2$, CO, $CH_4$) were analysed with a gas chromatograph of the Clarus 500 type (Perkin Elmer®) equipped with a polymeric column (Restek ShinCarbon®) and a thermal conductivity detector (TCD). The temperature of the detector, of the injection system and of the furnace was respectively 250°, 100° and 80° C. Argon was the eluent gas. Each sample of gas was analysed at least three times. With regard to experiments 1 to 21 conducted in the capsules, it was considered that the whole of the $H_2$ is in the gaseous phase obtained after having pierced the capsule. With regard to experiments 20 to 22 conducted in the autoclave, the composition of $H_2$ in the gas samples was determined while taking account of the proportion of $H_2$ in the gaseous phase and in the liquid medium.

The proportion of iron in the aqueous solution was determined just after taking the aqueous solution with samples of 2 ml by UV spectroscopy after complexing with orthophenantroline. Stored in a refrigerator, all the samples were analysed once again by ICP-OES.

pressure for a pH of 3. This is because the conversion into hydrogen is very different at a pH of 3.5 or 3 (respectively 1% or 28%), but is of the same order of magnitude at a pH of 3 or 2.5 (28% and 21%).

The results of experiments 7 to 17, in which an aqueous solution of acetic acid at pH 3 was used with a pressure of 300 bar, show that, for the same duration of reaction, the conversion of the reaction increases with temperature.

This observation is similar using water as the aqueous solution: the conversion into hydrogen is 3% at 150° C. (experiment 21), and 23% at 300° C. (experiment 22), that is to say nine times greater.

In water at pH 6 at two reaction temperatures (150° and 300° C.), the production of hydrogen was monitored over time (experiments 21 and 22).

At 150° C. (experiment 21), $H_2$ was produced solely in the first ten hours of reaction in a proportion corresponding to a

TABLE 1

Conditions of the experiments using wüstite and proportion of $H_2$ produced.

| Exp. | Acid | c.° (mol/l) | T (° C.) | P (bar) | Duration (h) | pH | g $H_2$/kg FeO (g/kg)* | conversion |
|---|---|---|---|---|---|---|---|---|
| 1 | MeCOOH | 0.05 | 150 | 300 | 240 | 3 | 2.62 | 28% |
| 2 | Oxalic acid | 0.001 | 150 | 300 | 240 | 3 | 0.24 | 3% |
| 3 | HCl | 0.001 | 150 | 300 | 240 | 3 | 0.20 | 2% |
| 4 | MeCOOH | 0.005 | 150 | 300 | 72 | 3.5 | 0.074 | 1% |
| 5 | MeCOOH | 0.05 | 150 | 300 | 72 | 3 | 2.58 | 28% |
| 6 | MeCOOH | 0.5 | 150 | 300 | 72 | 2.5 | 1.91 | 21% |
| 7 | MeCOOH | 0.05 | 100 | 300 | 72 | 3 | 0.058 | <1% |
| 8 | MeCOOH | 0.05 | 200 | 300 | 72 | 3 | 5.34 | 58% |
| 9 | MeCOOH | 0.05 | 150 | 300 | 24 | 3 | 1.34 | 14% |
| 10 | MeCOOH | 0.05 | 150 | 300 | 3 | 3 | 0.068 | <1% |
| 11 | MeCOOH | 0.05 | 150 | 300 | 168 | 3 | 4.08 | 44% |
| 12 | MeCOOH | 0.05 | 150 | 300 | 72 | 3 | 2.46 | 27% |
| 13 | MeCOOH | 0.05 | 150 | 300 | 8 | 3 | 0.30 | 3% |
| 14 | MeCOOH | 0.05 | 100 | 300 | 172 | 3 | 0.23 | 2% |
| 15 | MeCOOH | 0.05 | 200 | 300 | 24 | 3 | 3.74 | 40% |
| 16 | MeCOOH | 0.05 | 200 | 300 | 3 | 3 | 2.86 | 31% |
| 17 | MeCOOH | 0.05 | 200 | 300 | 48 | 3 | 3.26 | 35% |
| 18 | HCl | 0.001 | 150 | 300 | 72 | 3 | 0.084 | <1% |
| 19 | HCl | 0.001 | 200 | 300 | 72 | 3 | 0.19 | 2% |
| 20 | MeCOOH | 0.05 | 150 | 160 | 48 | 3 | 8.06 | 87%*** |
| 21 | Water | — | 150 | 150 | 64.5 | 6 | 0.26 | 3%*** |
| 22 | Water | — | 300 | 180 | 144 | 6 | 2.18 | 23%*** | c. ° = acid concentration
T = temperature,
P = pressure
*mass of $H_2$ produced measured by gas chromatography divided by the initial mass of material containing wüstite
** conversion calculated from the mass of $H_2$ produced
***The conversion differences observed in the capsules (experiments 1 to 19) or in the autoclave (experiments 20 to 22) for similar conditions of pressure, temperature and nature of the aqueous solution could be explained by the great difference in FeO/aqueous solution ratio (1/200 in autoclave and 1/1 in the capsules) and/or the almost absence of gaseous phase in the experiments carried out in capsules and/or especially in the absence of stirring of the reaction medium in the capsules.

The conversion of the reaction of step a) of the method (last column in table 1) was calculated by analysing the quantities of hydrogen (penultimate column in table 1), which are directly correlated with the quantities of magnetite.

Influence of the Nature of the Acid on the Conversion

The comparison of the results of experiments 1, 2 and 3 show that, at 150° C. and 300 bar, the proportion of hydrogen is ten times greater when acetic acid is used in place of hydrochloric or oxalic acid.

Influence of the pH and Temperature on the Conversion

The comparison of the results of experiments 4, 5 and 6 shows that, at a temperature of 150° C. and 300 bar and when acetic acid was used, the proportion of hydrogen is much greater at pH 2.5 or 3 than at pH 3.5. The optimum conditions appear to be achieved at these temperatures and conversion of 3%. Small quantities of magnetite were identified by XRPD in the residual FeO medium. Between 10 hours and 65 hours of reaction time no $H_2$ was produced.

At 300° C. (experiment 22), in the first ten hours of the reaction, the hydrogen production kinetics was four times greater than at 150° C. Unlike the experiment at 150° C., $H_2$ was always produced after 10 hours of reaction, at a production level that gradually decreased with time. After 144 hours, a conversion of 23% was obtained.

It is therefore possible to carry out the reaction at pH 6, but it is necessary to use higher temperatures than those necessary at pH 3. A comparison of the results of experiments 20 and 21 shows that the conversion of the reaction is greatly influenced by the presence of acetic acid. This is because, at 150° C., when the aqueous solution is water, FeO practically did not react (experiment 21), whereas when the aqueous solution is an aqueous solution at 0.05 mol/litre of acetic acid pH of 3, the conversion was almost total in 10 hours.

A comparison of experiments 20 and 22 shows that, in order to increase the kinetics of the reaction, the use of an acid aqueous solution is much more advantageous than increasing the temperature.

The solid obtained at the end of the reactions was washed several times in water, ground and then analysed by X-ray powder diffraction (XRPD). The diffractograms were obtained with a D8 diffractometer (Bruker, CuKα radiation) (2θ scanning at 0.026°, 8 seconds).

Some of the solid was kept unground for analysis by electron microscopy, scanning electron microscopy (SEB), field emission scanning electron microscopy (FE-SEM) (Zeiss Ultra-55 apparatus using both secondary electron detection and back-scattered electrons) and transmission electron microscopy (TEM) (Jeol FEG 2100F apparatus used at 200 kV). The two sets of apparatus were provided with an energy-dispersive X-ray spectroscopy (EDS) detector for chemical analysis. For field-emission SEM analyses, before the Au—Pd metallisation, the sample was either mounted on a double-face carbon based adhesive or incorporated in an epoxy resin and polished. For TEM analyses, a drop of the sample in powder form was dispersed in ethanol and deposited on a grid covered with carbon of the Lacey type.

Observation of the solids obtained by FE-SEM made it possible to distinguish the wüstite and magnetite. FeO, with a higher average atomic number, the back-scattered electron flow is greater than that issuing from magnetite.

On a micron scale, the FE-SEM figures of the solid sampled in the autoclave during experiments 21 and 22 show that the oxidation of FeO into magnetite is mainly located in channels distributed homogeneously in the grains. The magnetite appears to nucleate at structural faults or cracks. The magnetite could be formed by a process of auto-oxidation of the FeO. Whatever the oxidation process that takes place, the formation of magnetite in the grains suggests that the kinetics of the reaction is not directly correlated with the specific surface area of the FeO used as the starting product. In other words, the grinding of the FeO grains to reduce the sizes thereof should not increase the kinetics of the reaction significantly.

Figure 1:
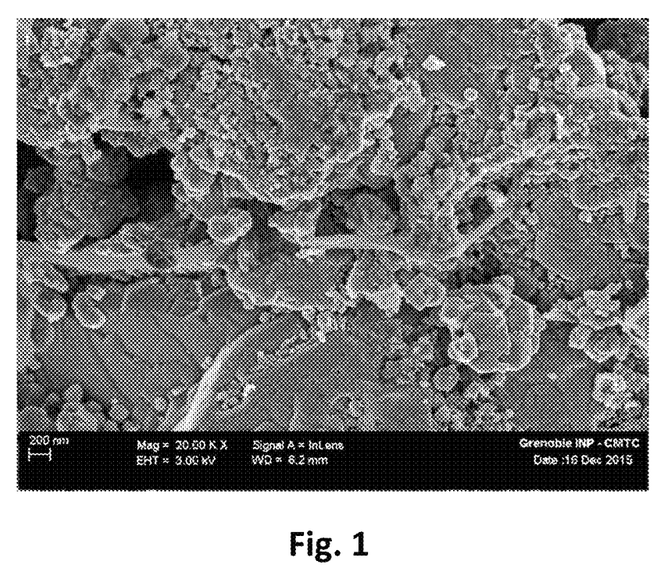
FIG. 1 is an image obtained by FE-SEM (Zeiss Ultra-55 apparatus using secondary electron detection) of the solid obtained at the end of experiment 20 of example 1 with a magnification of 20,000 (reference of the Polaroid type).
Figure 3:
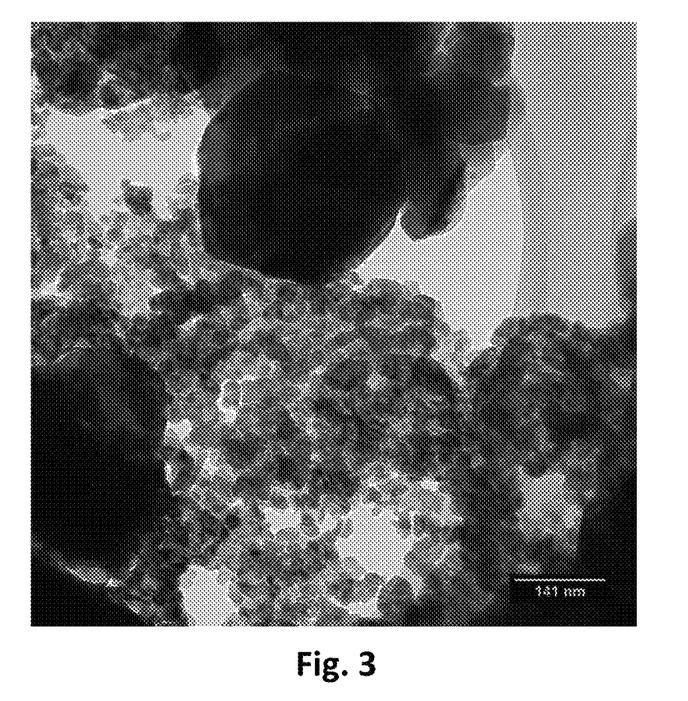
FIG. 3 is an image obtained by TEM (transmission electron microscopy) (JEOL FEG 2100F apparatus used at 200 kV) of the solid obtained at the end of experiment 20 of example 1.

The combined analysis of the FE-SEM images (FIG. 1, experiment 20) and TEM images (FIG. 3, experiment 20) afforded an estimation of the populations and distributions of the magnetite particles produced. The solid obtained contains magnetite in the form of particles with three populations of size:

10 to 20 nm, 100 to 200 nm, of micrometric size.

The analytical techniques and apparatus described in example 1 will be used in all the following examples.

Example 2: Preparation of Magnetite from a WÜStite/Cao Mixture

In order to simulate the behaviour of the wüstite in steelworks slag, of which CaO is a majority component, experiments were carried out in gold capsules on wüstite/CaO mixtures.

TABLE 2

Conditions of the experiments using a wüstite/CaO mixture and proportion of hydrogen produced.

| Exp. | Material | Acid | c. ° (mol/L) | pH | T (° C.) | P (bar) | Duration (h) | g $H_2$/kg FeO - (g/kg) |
|---|---|---|---|---|---|---|---|---|
| 23 | FeO/. Ca(OH)$_2$.: 1/1* | MeCOOH | 0.05 | 9.1 | 150 | 300 | 72 | 0.00051 |
| 24 | FeO/. CaCO$_3$.: 1/1* | MeCOOH | 0.05 | 5.8 | 150 | 300 | 72 | 0.051 |
| 25 | FeO reference) | Water | 0.05 | 3.0 | 150 | 300 | 72 | 2.47 | c. ° = acid concentration,
T = temperature,
P = pressure
*mass ratios

The results in table 2 show that the addition of CaO, whether it be in the form of Ca(OH)$_2$ or CaCO$_3$, inhibits the reaction, which would appear to be explained in particular by the increase in pH caused by these compounds.

Example 3: Preparation of Magnetite from Steelworks Slag

Experiments were carried out on steelworks slag of the LAC type sampled at the Fos sur Mer site. This slag underwent ageing of two weeks in air on the site.

TABLE 3

Conditions of the experiments using steelworks slag.

| Exp. | Material | Acid | c. ° (mol/l) | T (° C.) | P (bar) | Duration (h) |
|---|---|---|---|---|---|---|
| 26 | Slag | MeCOOH | 2 | 150 | 300 | 72 |
| 27 | Slag | MeCOOH | 4 | 150 | 300 | 72 |
| 28 | Slag | MeCOOH | 2 | 300 | 300 | 72 |
| 29 | Slag | MeCOOH | 4 | 300 | 300 | 72 |
| 30 | Slag | Water | — | 250 | 180 | 72 |
| 31 | Slag | Water | — | 300 | 180 | 72 |
| 32 | Slag | Water | — | 350 | 180 | 72 | c. ° = acid concentration,
T = temperature,
P = pressure

Experiments 26, 27, 28 and 29 were carried out in capsules in an acetic acid solution. Because of the presence of CaO and Ca(OH)$_2$ in the steelworks slag, high concentrations of acetic acid are necessary to achieve the pH range sought.

The solids obtained in the various experiments were analysed by XRPD. At 300° C., the initial FeO present in the slag was almost completely consumed and a very high proportion of magnetite was observed. At 150° C., the conversion of FeO is very small. The increase in concentration of acetic acid accelerates the formation of magnetite.

Experiments 30, 31 and 32 were conducted in an autoclave with samplings in the presence of deionised water. Because of the presence of CaO and Ca(OH)$_2$ in the steelworks slag, the reaction was conducted at a pH of between 11 and 12. The conversion levels calculated according to the measurement of $H_2$ produced are, for experiments 30, 31 and 32, respectively 9%, 20% and 43% after 24 hours of processing. The temperature rise affords a significant kinetic acceleration.

A magnetic separation was carried out according to the protocol described previously. A first separation of the solid in suspension in water was carried out using a permanent magnet at ambient temperature and under ultrasound. A hydrochloric acid solution at 1 mol/litre was then added to the separated solid in order to improve the dissolution of the residual Ca phases and therefore the purity of the solid obtained in the end. A second separation step was then carried out in this suspension at ambient temperature and under ultrasound. The solids of the various separation steps were analysed by XRPD in order to quantify the proportions of magnetite and wüstite thereof.

These analyses made it possible to estimate the solid obtained after reaction at a temperature of 300° C. and a pressure of 180 bar in the presence of water and following the processing described above that contains approximately 20% by weight wüstite and 80% by weight magnetite (all size populations merged).

Figure 2:
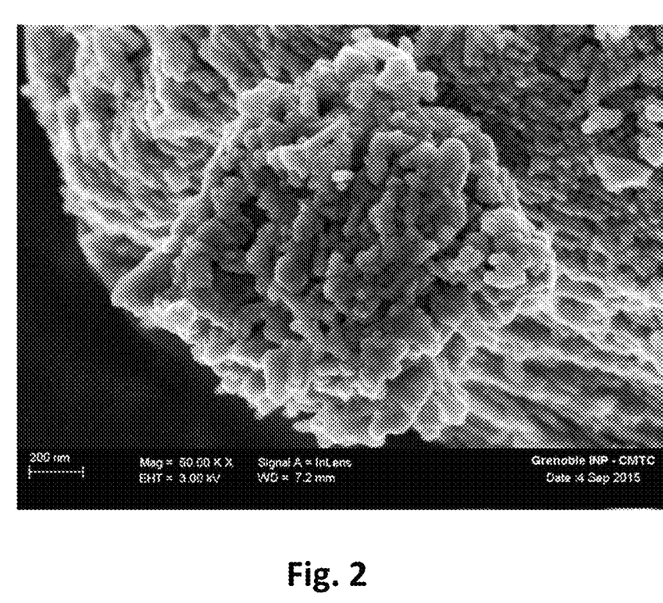
FIG. 2 is an image obtained by FE-SEM (Zeiss Ultra-55 apparatus using secondary electron detection) of the solid obtained at the end of experiment 31 of example 3 with magnification of 50000.
Figure 4:
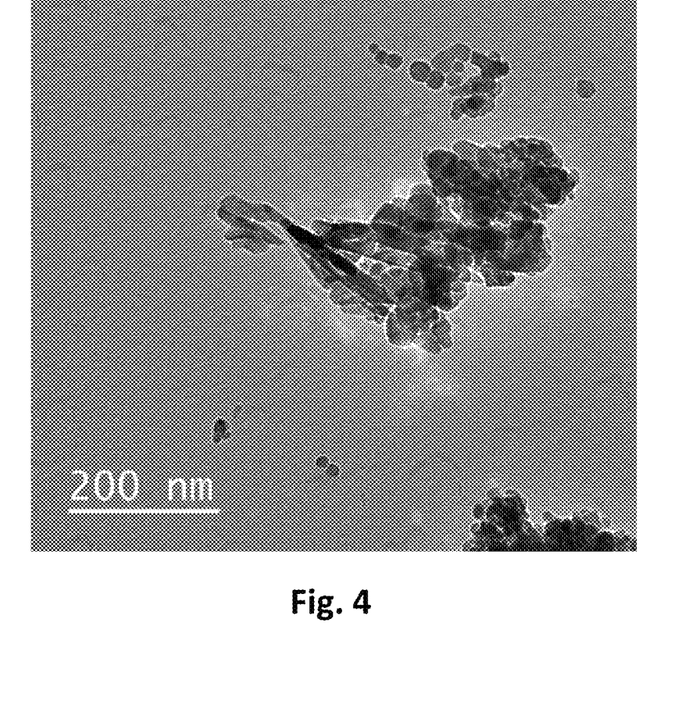
FIG. 4 is an image obtained by TEM (transmission electronic microscopy) (JEOL FEG 2100F apparatus used at 200 kV) of the solid obtained at the end of experiment 31 of example 3.

The combined analysis of the FE-SEM images (FIG. 2, experiment 31) and TEM images (FIG. 4, experiment 31) afforded an estimation of the populations and distributions of the nanomagnetites produced. The solid obtained contains magnetite in the form of particles with three populations of size:
10 to 20 nm,
100 to 200 nm,
of micrometric size.

In order to estimate the proportions of each population, it is possible to use a method using intense field gradients by virtue of metal fibres immersed in the solution that flows in a strong magnetic field (0.5-1.2 T).

Example 4: Preparation of Magnetite from Steelworks Slag Previously Treated with Acetic Acid Experiments were carried out using steelwork slag, at a temperature of 250° C. and a pressure of 150 bar on previously ground samples and for a slag/solution mass ratio of 1/100.

In experiment 33, the slag was used without prior treatment. The reaction was carried out in the presence of water and at a natural pH of the slag in suspension lying between 11 and 12 for 72 hours.

In experiment 34, the slag underwent a prior treatment with an aqueous solution at 4 mol/litre of acetic acid at ambient temperature (25° C.). This treatment makes it possible to decalcify the slag and to double the concentration of iron oxide. The reaction at high temperature (250° C.) was carried out in the presence of an aqueous solution of acetic acid at 1 mol/litre. The prior decalcification of the slag makes it possible to work at a pH lying in the range from 2 to 4. The pH during the reaction at 250° C. was measured at between 3.5 and 4.

Figure 5:
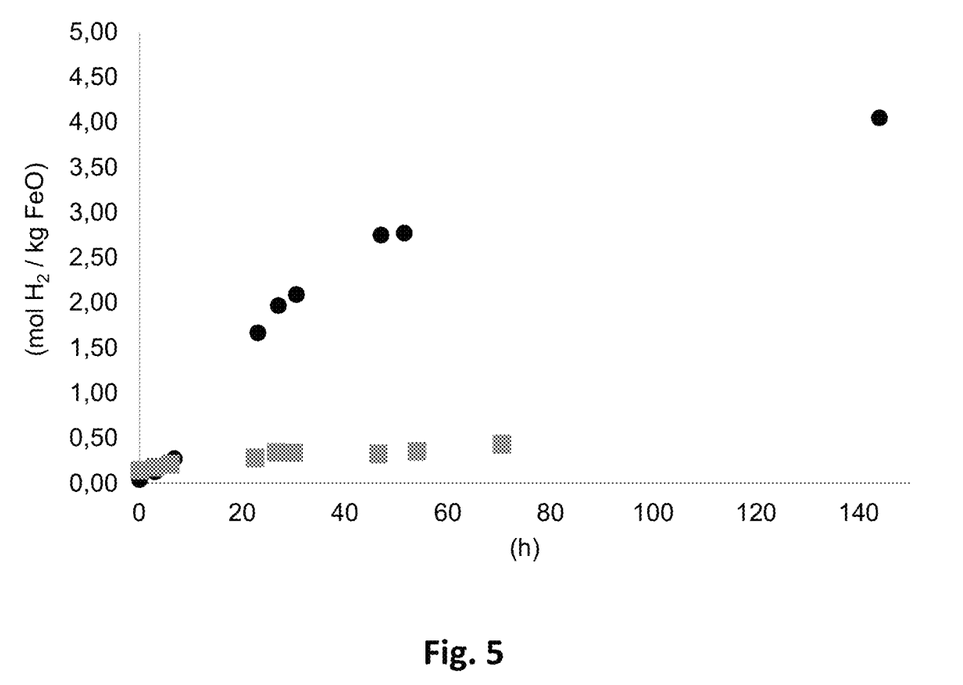
FIG. 5 shows the quantity of hygiene produced standardised by the theoretical concentration of ferrous oxide (FeO) in the samples (mol $H_2$/kg FeO) as a function of the time in hours (h) for the steelworks slag used without prior treatment (squares) in water (experiment 33) or the steelworks slag previously decalcified by treatment with a solution of acetic acid and reacted in a solution of acetic acid at 1 mol/litre (rounds) (experiment 34) (example 4).

The proportion of hydrogen produced was monitored in accordance with the method described for example 1 and is supplied in FIG. 5. The results show that the conversion is appreciably improved by using a previously decalcified slag.

The solids obtained at the end of the reactions were treated as described for example 3. The analyses by powder X-ray diffraction made it possible to quantify the proportions of magnetite and wüstite. The magnetite is in the majority and represents a proportion greater than 70% of the total mass of the solid.

REFERENCES

[1] Hironori et al. (2007) Synthesis of $Fe_3O_4$ nanoparticles with various sizes and magnetic properties by controlled hydrolysis Journal of Colloid and Interface Science 314 274-280
[2] Martinez-Mera et al. (2007) Synthesis of magnetite ($Fe_3O_4$) nanoparticles without surfactants at room temperature. Materials Letters 61, 4447-4451
[3] Malvoisin B., Brunet F., Carlut J., Montes-Hernandez G., Findling N., Lanson M., Vidal O., Bottero J. Y. and Goffé B. (2013) High-purity hydrogen gas from the reaction between BOF steel slag and water in the 473-673 K range. Int. J. Hydrogen Energ. 38(18), 7382-7393.
[4] Eloneva et al. (2008) Steel converter slag as a raw material for precipitation of pure calcium carbonate. Ind. Eng. Chem. Res., 47, 7104-7111.
[5] Kelland (1998) Magnetic separation of nanoparticles. IEEE transactions on magnetics, 34, 2123-2125.

The invention claimed is:

1. A method for preparing magnetite comprising, in sequence, the steps of:
combining a wüstite-containing material with an acidic aqueous treatment solution to form a reaction mixture;
exposing the reaction mixture to a reaction condition comprising
a reaction temperature between 100 and 500° C., the aqueous solution being at least partially in liquid form during the reaction;
maintaining the reaction mixture under the reaction condition for a reaction period of sufficient duration to produce a treated wüstite-containing material in which at least 10% of the wüstite originally present in the wüstite-containing material has been converted to magnetite particles, and
recovering the magnetite particles, wherein at least 25 wt % of the recovered magnetite particles are nanoparticles.

2. The method according to claim 1, wherein the reaction temperature is 150 to 350° C.

3. The method according to claim 1, wherein the acidic aqueous treatment solution has a pH less than 6 when measured at 25° C. and 1 bar.

4. The method according to claim 3, wherein the acidic aqueous treatment solution has a pH of from 2 to 5.

5. The method according to claim 3, wherein the acidic aqueous treatment solution has a pH of from 2.5 to 3.

6. The method according to claim 3, wherein the acidic aqueous treatment solution includes a carboxylic acid able to form a complex with an iron ion.

7. The method according to claim 1, wherein the reaction pressure is 5 to 700 bar.

8. The method according to claim 1, wherein the wüstite-containing material is steelworks slag.

9. The method according to claim 8, wherein the steelworks slag is a decalcified slag.

10. The method according to claim 8, further comprising:
treating the steelworks slag with an aqueous decalcification solution, wherein the decalcification solution has a pH of 1 to 6, for a treatment period sufficient to remove at least 90% of calcium from the steelworks slag.

11. The method according to claim 9,
the acidic aqueous treatment solution has a pH of from 3 to 4;
the reaction pressure is from 100 to 200 bar; and
the reaction temperature is from 200° to 300° C.

12. The method according to claim 1, wherein the step of recovering the magnetite comprises a magnetic separation operation.

13. The method according to claim 12, wherein the step of recovering the magnetite further comprises:
- separating the treated wüstite-containing material from the acidic aqueous treatment solution;
  - optionally grinding the treated wüstite-containing material to obtain smaller particles of the treated wüstite-containing material;
  - adding water or an acidic aqueous first separation solution to the treated wüstite-containing material in order to obtain a first separation mixture,
  - separating the first separation mixture using a magnetic field to recover a first solid magnetic portion of the first separation mixture,
  - adding water or an acidic aqueous second separation solution to the first solid magnetic portion in order to obtain a second separation mixture,
  - separating the second separation mixture using a magnetic field to recover a second solid magnetic portion of the second separation mixture.

14. The method according to claim 1, wherein the step of recovering the magnetite further comprises a high-gradient magnetic separation operation.

15. The method according to claim 1, wherein the wüstite-containing material is wüstite.

16. The method according to claim 1, wherein the reaction temperature is 150 to 250° C.

17. The method according to claim 3, wherein the acidic aqueous treatment solution has a pH of from 2 to 4.

18. The method according to claim 6, wherein the organic acid is acetic acid.

19. The method according to claim 1, wherein the reaction pressure is 10 to 400 bar.

20. The method according to claim 1, wherein the reaction pressure is 40 to 200 bar.

* * * * *